Jan. 10, 1933.　　　M. K. BUCHANAN　　　1,893,535
ICE CUBE PAN LIFTER
Filed Sept. 28, 1929
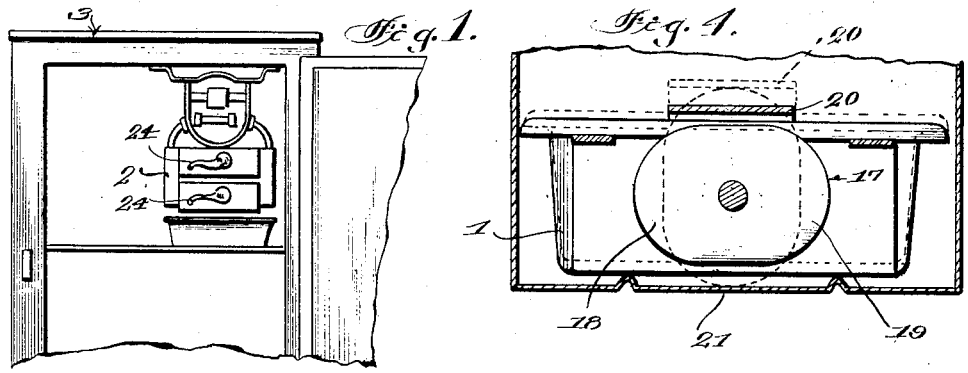
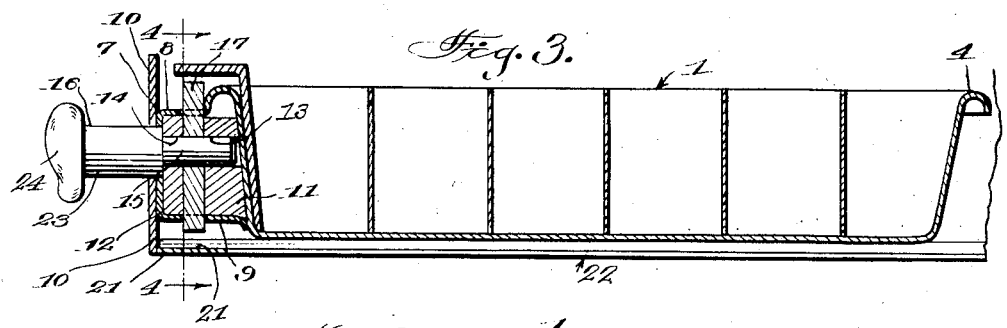
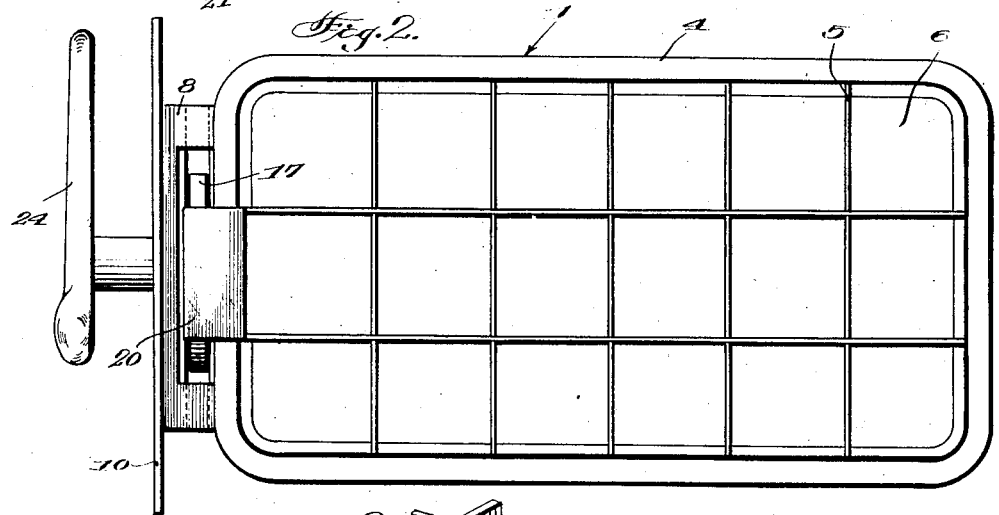
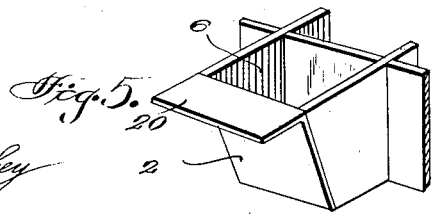
WITNESS
INVENTOR
Michael Kerin Buchanan
BY
ATTORNEY Patented Jan. 10, 1933

1,893,535

UNITED STATES PATENT OFFICE

MICHAEL KERIN BUCHANAN, OF OCEAN VIEW, VIRGINIA

ICE CUBE PAN LIFTER

Application filed September 28, 1929. Serial No. 395,927.

My invention relates to improvements in ice cube pan lifters for mechanical refrigerators, and it consists in the combinations, constructions and arrangements herein described and claimed.

An object of my invention is to provide an ice cube pan lifter that by simple mechanical means is raised from its supporting slide when frozen thereto for the purpose of removing the same from a freezing chamber.

A further object of my invention is to raise the grid containing the frozen cubes from the base of the pan, breaking the connection of said frozen cubes to the base and sides of the pan, due to freezing.

A further object of my invention is to provide a simple mechanical means which breaks the frozen connection between the bottom of the pan and the slide support in the freezing chamber in a sufficiently small movement to permit the pans to be placed close to the supporting slide, thereby doing away with guide rails on said supporting slide to prevent freezing to said supporting slide, and economizing the use of space.

A further object of my invention is to provide an ice pan lifter that will raise the grid for permitting the easy filling of the pan with water for freezing purposes, since as is well known the grids of ice cube pans are fitted so closely to the walls and base of the pan that the passage of water from one cubical chamber to another is prevented.

A further object of my invention is to provide a device of the type described which is simple in construction, has few parts and is not likely to get out of order easily.

Other objects and advantages will appear in the following specification and the novel features of the invention will be particularly pointed out in the appended claims.

My invention is illustrated in the accompanying drawing forming part of this application, in which:—

Figure 1 is a front elevational view, showing my pan lifter operatively positioned on pans in the freezing chamber of a mechanical refrigerator;

Figure 2 is a plan view of an ice cube pan equipped with my lifting device;

Figure 3 is a sectional view through my device, with parts thereof shown in elevation;

Figure 4 is a sectional view, on line 4—4 of Figure 3 of the operating parts of my device, portions thereof being shown in elevation; and Figure 5 is a perspective detail view of a portion of the device.

In carrying out my invention, I make use of an ordinary ice cube freezing pan 1 used for freezing water into ice cubes in the freezing chambers 2 of a mechanical refrigerator 3. These pans 1, as is very well known, are of the conventional form comprising an ordinary shallow pan 4 containing a grid 5, consisting of walls transecting one another, and forming with the walls of the pan and the bottom thereof a plurality of cubical freezing chambers 6.

To the front of the pan 1 I secure by welding or other suitable processes my mechanical lifter, generally designated at 7. Connected to and projecting from the front end of the pan adjacent the upper and the lower portions thereof are the supports 8 and 9 adapted to support the front plate 10 secured thereto by any suitable means. Comprised between the supports are the post bearing members 11 and 12 which provide spaced bearing surfaces 13 and 14 in which the reduced portion 15 of a pan operating post member 16 is journaled. Comprised between the post bearing members 11 and 12 and fixedly mounted to the reduced portion 15 of the cam operating post member 16 is the cam 17, substantially elliptical in shape and provided with the lobes 18 and 19. As shown by the dotted lines in Figure 4, this cam is adapted to engage in one of its operative positions by means of the cube lobes 18 and 19, the projecting flange 20 fastened to and comprising one of the walls of the grid member 5, as is more clearly shown in Figure 5, and the front face portion shown at 21 in Figures 3 and 4 of the sliding support 22 for pan 1. As shown by the full line position of this cam in Figure 4, when turned in one operative position, the cam is thrown out of engagement with the flange portion 20 and the base portion 21 of the sliding support 22.

The cam operating post member 16 is provided with an enlarged portion 23 projecting through an aperture provided therefor in the front plate 10 and providing at the end thereof a handle 24 of sufficient length to provide enough leverage for the operation of the cam by the application of a small force.

From the foregoing description of the various parts of the device, the operation thereof will be readily understood.

When it is desired to freeze the water in the cubes, the pan is removed from the freezing chamber. The operator, by grasping and turning the handle 24, then rotates cam 17 from the full line position shown in Figure 4 to the dotted line position shown therein. This raises the grid 5 from the base and walls of the pan 4, as shown by the dotted lines. Water is then poured into any of the spaces provided by the grid 5 and due to the spaced position of said grid 5 relative to the pan 4 quickly passes between said pan and said grid, filling the pan. The cam is then rotated by handle 24 to the inoperative full line position of Figure 4. The pan is then slid onto the supporting slide 22 in the freezing chamber 2 for the freezing operation.

When the water has been frozen into cubes and it is desired to remove the same from the freezing chamber 2 and the freezing pan 1, the handle 24 is rotated, moving the cam 17 from the full line inoperative position shown in Figure 4 to the dotted line operative position shown in said figure. As appears from an examination of Figure 4, this operation raises the pan 4 from the supporting slide 22 breaking the frozen connection between the bottom of said pan and said supporting slide. Simultaneously with this operation, the grid by means of the interengagement of flange 20 and the other lobe of said cam 17 is raised from the base and walls of the pan 4 carrying the ice cubes with it. The frozen connection of the pan 1 to the supporting slide 22 in the freezing chamber 2 and between the grid 5 and the pan 4 having been broken, the pan 1 can easily be withdrawn from the chamber 2 and the grid 5 lifted from pan 4. The ice cubes can then be readily removed from said grid by leaving the same exposed to the atmosphere or by the pouring of water thereover.

It is thus seen that I have provided a simple mechanical means which may be applied to any conventional form of ice cube pan for mechanical refrigerators or may be constructed integrally with such an ice cube pan for breaking the frozen connections existing between said ice cube pans and their supports, and between the ice cubes contained within the grids and the base and walls of said ice cube pans, whereby the removal of said pans from said freezing chamber and said ice cubes in said pans is facilitated, thereby eliminating the application of considerable manual force on the front plate 10 with consequent weakening, loosening, and sometimes severing of the connection between said front plate 10 and the ice pans 1, as in ice cube pans of conventional structure.

It is readily seen that as my device effectively breaks the frozen connection between the freezing pan and a supporting slide and the grid and the bottom of the pan with a movement of only about a quarter of an inch, larger pans might be used due to the economy of space occasioned by the use of my device, and the pans may be constructed of lighter material, due to the fact that they are so easily removed from their supporting slide. It is also clear that, due to the effective leverage ratio obtained between the operating handle and operating cam, a frozen connection between the entire base of the pan and the supporting slide might be easily broken, thereby doing away with the rails disclosed in Figure 4 with consequent reduction of the time required for freezing the liquid in the freezing pan.

I claim:

1. In an ice cube pan for mechanical refrigerators, means when operated for causing breaking of the frozen connection between the pan and its support, said means including means for breaking the frozen connection between the cubes and the pan.

2. In an ice cube pan for mechanical refrigerators, means for simultaneously breaking the frozen connections between the pan and its support and between the cubes and the pan.

3. In an ice cube pan, means on the exterior of the pan for forcibly raising the pan from its support and including means for forcibly raising the ice cubes from the pan, whereby the frozen connection between said members is broken.

4. An ice cube pan comprising a containing pan, a grid, and cooperating means on the grid and pan for raising and lowering the grid relative to said pan at will for breaking the ice cubes loose from the pan.

5. An ice cube pan comprising a containing pan, a grid, and unitary means for forcibly raising said containing pan from its support and said grid from the pan.

6. An ice cube pan comprising a containing pan, a grid, and unitary cam means for raising and lowering the pan relative to its support and the grid relative to the pan.

7. Means for facilitating the removal of ice cubes from an ice cube pan having a grid comprising means for raising the pan from its support, and means on the grid and engaged by the raising means for the pan for raising the grid from the pan.

8. An ice cube pan consisting of a shallow containing pan, a grid adapted to form the walls of the ice cubes positioned in said shallow pan and having a projecting flange, and means for forcibly raising said shallow containing pan from its support and said grid from the pan, comprising a bilobated cam, secured to said pan, and adapted to engage said flange and said support, and means for operating the cam.

9. A device of the class described comprising a shallow containing pan, a handle for manipulating the pan and rotatably mounted on the pan, a cam rotated by said handle, a grid in the pan and having a flange projecting into the path of the cam when said cam is revolved by the handle for elevating the flange and grid relative to the pan.

10. A device of the class described comprising a pan, a grid movably mounted in the pan, a movable handle on the pan, and cooperating means on the handle and grid adapted to be operatively engaged when the handle is moved for elevating the grid in the pan.

11. A device of the class described comprising a pan, a grid removably mounted in the pan having a projecting flange, a support extending from one end of the pan and providing with bearings, a post rotatably mounted in the bearings, a cam secured to the post and engageable with the flange for elevating the grid in said pan, and a handle for rotating said post.

12. A device of the class described comprising a pan, a grid removably mounted in the pan having a projecting flange, a support extending from one end of the pan and provided with bearings, a post rotatably mounted in the bearings, a cam secured to the post and engageable with a fixed support on which the pan rests for raising the pan from the fixed support and for engaging the flange and elevating the grid when said cam is rotated, and means for rotating the post.

13. In freezing apparatus for liquids, the combination of a tray for making ice cubes, a grid within said tray adapted to form a plurality of ice cube molds, and cam means for raising the grid from the tray.

14. An ice cube pan having means for forcibly raising the pan from its support and the cubes from said pan, said means comprising a grid member supporting said cubes and a cam having one lobe for engagement with said support and another lobe for engagement with said grid member.

15. An ice cube pan having means for forcibly raising the pan from its support and the cubes from said pan, said means comprising a grid member supporting said cubes and a cam having lobes for simultaneous engagement with said support and said grid member.

16. An ice cube pan having means for forcibly raising the pan from its support and the cubes from said pan, said means comprising a grid member supporting said cubes, a cam having one lobe for engagement with said support and another lobe for engagement with said grid member, and lever means operable between said pan and said grid member.

17. In a freezing apparatus for liquids, the combination of a tray for making ice cubes, a grid within the tray adapted to form a plurality of ice cube molds and manually operated means for raising or lowering at will the grid in the pan for breaking the ice cubes loose from the pan.

18. In a freezing apparatus for liquids, the combination of a tray, a grid within the tray and composed of a plurality of longitudinally disposed walls and transverse walls rigidly connected together to form ice cube molds, and means for raising or lowering the grid in the pan at will for breaking the ice cubes loose from the pan.

19. In a freezing apparatus for liquids, the combination of a tray for making ice cubes, a grid within the tray adapted to form a plurality of ice cube molds and means for raising one end of the grid in the pan at will for breaking the ice cubes loose from the pan.

20. An ice cube pan comprising a containing pan including an ice cube forming grid within the pan, a cam means on the exterior of the pan adapted to be revolved for forcibly raising the containing pan from its support, a shaft rotatably mounted on the tray and connected to the cam for rotating said cam.

MICHAEL K. BUCHANAN.